Figure 3:
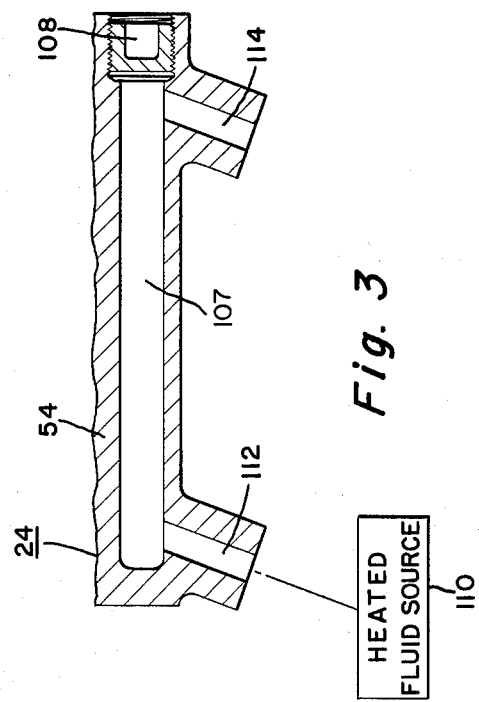

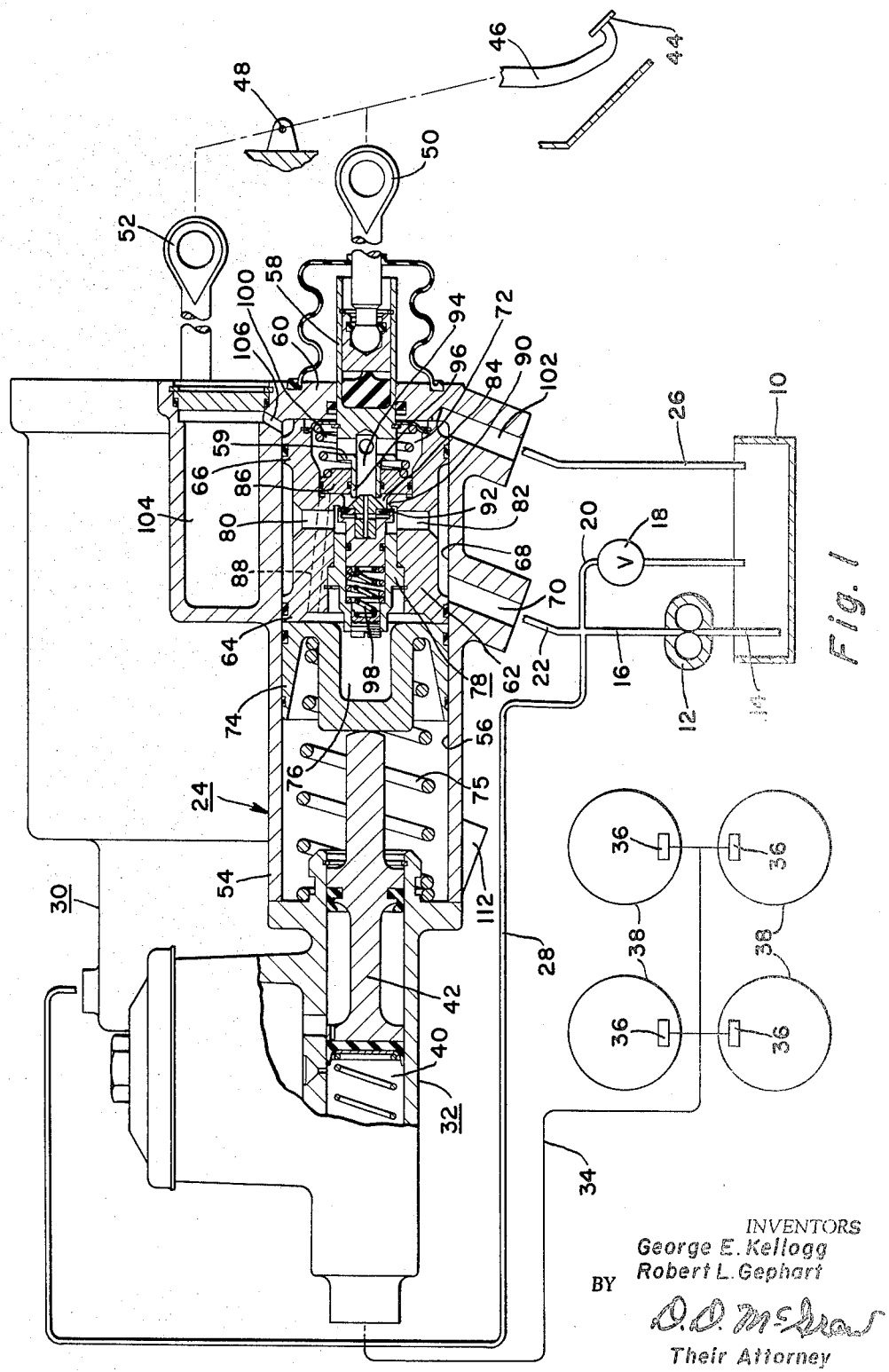

INVENTORS
George E. Kellogg
Robert L. Gephart
BY
D. D. McGrau
Their Attorney

United States Patent Office
3,253,409
Patented May 31, 1966

3,253,409
HYDRAULIC FLUID VISCOSITY COMPENSATION MECHANISM FOR A HYDRAULIC POWER BOOSTER
George E. Kellogg, Miamisburg, and Robert L. Gephart, Spring Valley, Ohio, assignors to General Motors Corporation, Detroit, Mich., a corporation of Delaware
Filed Aug. 5, 1964, Ser. No. 387,690
12 Claims. (Cl. 60—52)

The invention relates to mechanism for compensating for the change in hydraulic fluid viscosity in mechanism such as hydraulic brake boosters which are subjected to extremes of ambient air temperatures, particularly including low temperatures. The invention is particularly illustrated as being embodied in a hydraulic power brake booster mechanism for vehicles. Mechanisms of this type are often constructed with closed center valve controls so that fluid does not dynamically pass through the mechanism when the brakes are not applied. Thus cold ambient air temperatures have an opportunity to reduce the temperature of the fluid statically contained therein, and have an adverse effect on the viscosity characteristics of the fluid, resulting in poor control.

All fluids possess viscosity and, therefore, exhibit certain frictional phenomena when fluid motion occurs. Viscosity is due primarily to cohesion and interaction between fluid molecules, and, as flow occurs, these effects appear as tangential or shear stresses between the moving fluid layers. Viscosity varies widely with temperature. In viscous liquids such as hydraulic fluid, viscosity is primarily dependent on the magnitude of the cohesive forces between the molecules. These forces increase rapidly with decreases of temperature and, therefore, the liquid viscosity increases as the temperature decreases.

In operating hydraulic power booster mechanisms such as hydraulic power brake boosters, it is highly desirable to maintain the operating and control hydraulic fluid within predetermined viscosity limits so as to maintain the mechanism operational characteristics within desirable limits. The hydraulic fluid viscosity has an effect on the valve controlling mechanism function, and, where hydraulic reaction is utilized to provide "feel," on the condition of the mechanism as sensed by the operator. Since vehicles utilizing such mechanisms are exposed to a wide range of ambient air temperatures, the viscosity of the hydraulic fluid utilized is varied, and often rises above viscosity limits which are desirable for proper operation. One of the manifestations of adverse viscosity characteristics in a fluid reaction system is the slowness with which the reaction member is moved by the pressurize fluid, resulting in slow generation of a reaction force felt by the brake operator.

It is now proposed to provide means for correcting the fluid in such mechanism for fluid viscosity above a predetermined limit when the fluid viscosity change is caused by low ambient air temperatures. It is more particularly proposed to provide the fluid viscosity correcting means in the mechanism in some instances as a fluid heating means which will heat at least some of the fluid statically contained in the mechanism to a higher temperature than the low ambient air temperature levels which have an adverse effect so that the viscosity of the hydraulic fluid is maintained below a predetermined viscosity limit. In mechanisms where the primary problem relates to the generation of reaction force, it is proposed to provide a decrease in fluid flow restrictions so as to effectively correct the mechanism operation when the fluid has a high viscosity characteristic caused by low ambient air temperature. In some mechanisms it is desirable to utilize both fluid heating means and the fluid flow correcting means to obtain desirable operating characteristics under low ambient air temperature conditions.

It is particularly proposed to provide an air bounce or fluid relief chamber in fluid communication with an exhaust chamber in which a reaction member normally displaces fluid when generating the reaction force. Thus, when some of the hydraulic fluid in the exhaust chamber is to be displaced, the high viscosity characteristic of the low temperature fluid is corrected by permitting additional fluid flow escape. Therefore, even though the fluid flows at a slower rate due to high viscosity, it is removed from the exhaust chamber in a sufficient quantity per unit of time to permit the reaction member to operate within acceptable limits.

Figure 2:
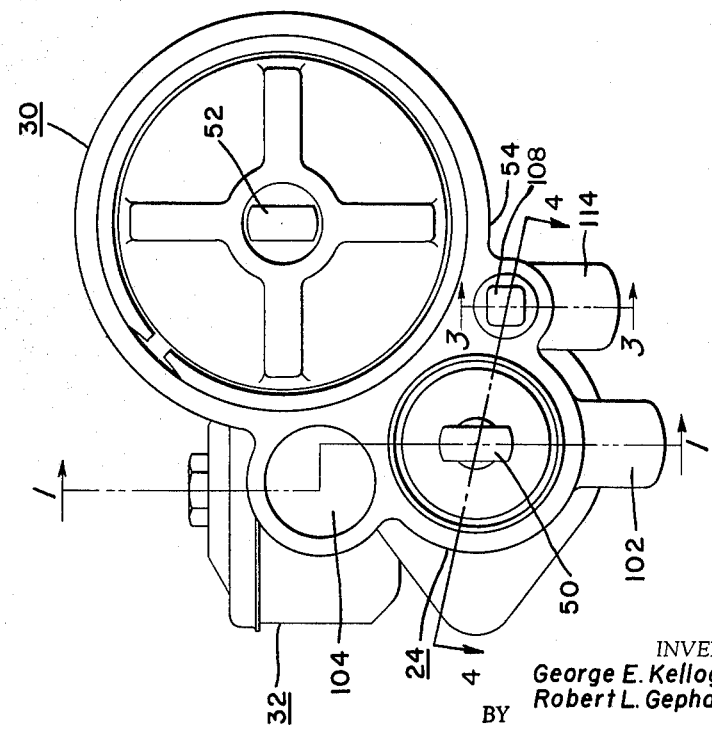
Figure 4:
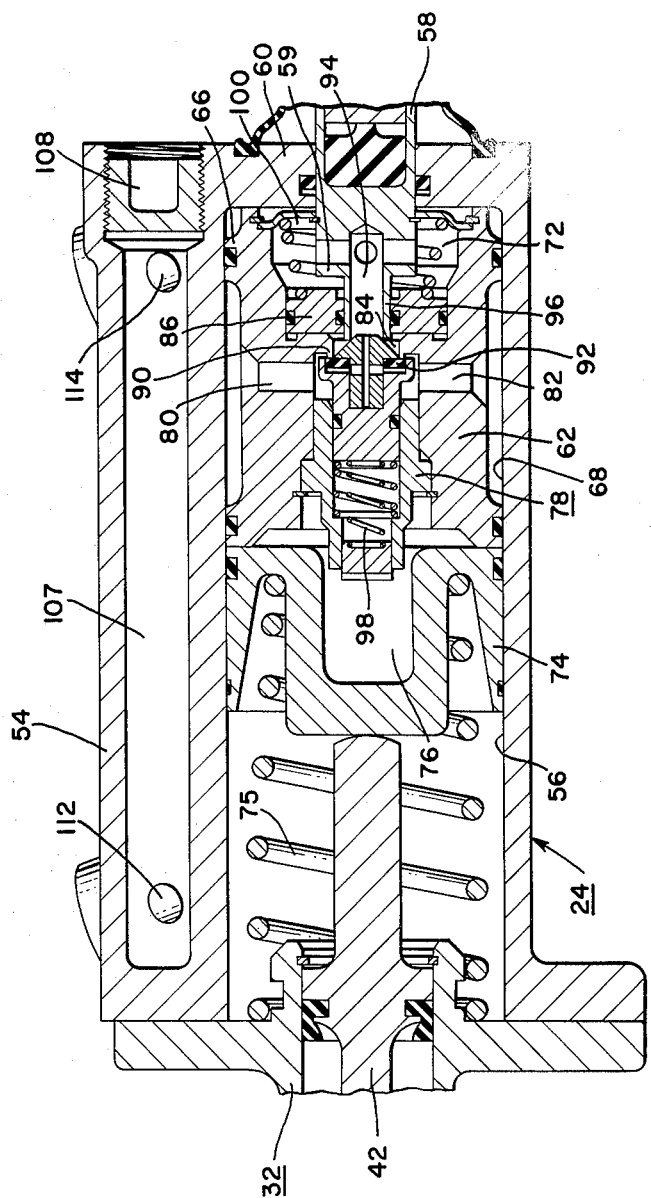

In the drawings:
FIGURE 1 is a schematic representation of a hydraulic brake booster system embodying the invention, with parts broken away and in section, the brake booster mechanism section being taken in the direction of arrows 1—1 of FIGURE 2.
FIGURE 2 is an end elevation view of the hydraulic pressure operated brake booster mechanism of FIGURE 1.
FIGURE 3 is a section view of a portion of the hydraulic booster mechanism taken in the direction of arrows 3—3 of FIGURE 2.
FIGURE 4 is a section view of a portion of the hydraulic booster mechanism taken in the direction of arrows 4—4 of FIGURE 2.

The system schematically shown in FIGURE 1 includes a hydraulic fluid reservoir 10, a hydraulic fluid pressurizing pump 12 connected by conduit 14 to receive fluid from reservoir 10, and further connected to deliver output pressure through conduit 16. A pressure relief valve 18 is connected in a conduit 20 which interconnects conduit 16 and the reservoir 10 so that the output pressure of pump 12 is controlled to a predetermined pressure limit. An extension 22 of conduit 16 delivers pressurized fluid to the hydraulic brake booster 24. Conduit 26 returns exhaust fluid from booster fluid 24 to the reservoir 10. Another extension 28 of conduit 16 may deliver pressurized fluid to a pedal height control mechanism 30, which forms no part of the present invention and is, therefore, not described in detail. Pump 12 may also be arranged to supply pressurized fluid to a power steering gear system.

The hydraulic brake booster 24 is arranged to operate the master cylinder 32. The hydraulic brake line 34 connects the output of the master cylinder 32 with the wheel cylinders 36 of the vehicle wheel brakes 38. When the master cylinder 32 is actuated to pressurize fluid in its chamber 40, by movement of the master cylinder piston 42 to the left, the vehicle wheel brakes are actuated. The brakes are released by movement of piston 42 to the right.

The vehicle in which the system is installed is provided with the usual brake pedal 44 by which the operator controls movement of the brake pedal arm 46, suitably pivoted to a portion of the vehicle at 48. Arm 46 is suitably connected to the push rod 50, and when the pedal height control mechanism 30 is utilized, to the pedal height control pull rod 52. Movement of pedal 44 is transmitted through arm 46 to push rod 50 to control the hydraulic brake booster 24.

The brake booster 24 includes a housing 54 in which a cylinder 56 is formed. The master cylinder assembly 32 is mounted on one end of the cylinder 56 and a control valve plunger 58 is reciprocably received in a sealed aperture formed in the end wall 60 in the other end of the cylinder 56. A valve body 62 is formed with end lands 64 and 66 and is received in the end of cylinder 56 adjacent wall 60. The annular chamber 68 formed by the valve body 62 and the portion of the wall of cylinder 56 intermediate the lands 64 and 66 is maintained in a pressurized fluid condition by hydraulic fluid entering inlet 70 from conduit extension 22. This fluid is statically contained in chamber 68 when the system is not operating the brakes. An exhaust chamber 72 is provided between cylinder end wall 60 and the rear end of the valve body 62. Plunger 58 extends into the exhaust chamber 72. A booster power wall 74, which may be a piston, is reciprocably received in cylinder 56 intermediate valve body 62 and the master cylinder assembly 32. Thus piston 74 and the forward end of the valve body 62 cooperate with cylinder 56 to define a fluid power chamber 76. Valve mechanism generally identified by the reference character 78 is provided in the valve body 62 to control the hydraulic brake booster 24. A conduit or passage system 80 includes a passage section 82 connecting pressurized chamber 68 with a central bore formed in the valve body 62 and containing portions of the valve mechanism 78, a reaction chamber 84 formed in the valve body 62 and defined by a portion of the valve mechanism 78 and a reaction piston 86 separating chamber 84 from the exhaust chamber 72, and a passage 88 interconnecting the power chamber 76 and the reaction chamber 84. The valve mechanism includes a valve seat 90 which is normally closed by the valve 92 to prevent fluid communication between the passage section 82 and the reaction chamber 84. The plunger 58 is provided with a passage or conduit 94 which fluid connects reaction chamber 84 with exhaust chamber 72 since the forward end of plunger 58 through which passage 94 is formed extends through reaction piston 86. Valve 92 is engageable with the valve seat 96 formed at the forward end of passage 94 in plunger 58. In the normal brake release position, valve 92 is not seated on seat 96. A valve spring 98 urges valve 92 to the right as seen in the drawing to normally maintain it seated against the seat 90. Valve 92 cannot move sufficiently to the right to normally engage the seat 96 when plunger 58 is in the extreme right or release postion. A reaction piston spring 100 is positioned in the exhaust chamber 72 is fluid connected by the outlet 102 to conduit 26 so that fluid may flow from the exhaust chamber and be returned to the reservoir 10.

Chamber 104, formed as a part housing 54 and located above exhaust chamber 72, is fluid connected with chamber 72 through passage 106 extending between exhaust chamber 72 and the lower portion of chamber 104. Air is trapped in chamber 104.

Housing 54 is also provided with a heat exchange passage 107 extending adjacent at least the pressurized chamber 68 in a heat exchange relation. Passage 107 may extend rearwardly to be adjacent exhaust chamber 72 and may extend forwardly to be adjacent power chamber 76. The passage is illustrated as having an open end closed by plug 108. A source of heated fluid 110 is connected to the inlet 112 of chamber 107 and a suitable outlet 114 for the chamber or passage 107 is provided. Depending upon the work required of heated fluid 110, outlet 114 is suitably connected to provide an operative structure. The source of heated fluid 110 may be the pump 12 which circulates fluid through the conduit 20, and in doing work on the fluid, heats the fluid to some extent. In some instances, pump 12 may be a power steering gear pump which is constantly working the fluid pumped through it and heating it. In other instances the source of heated fluid 110 may be operated to heat fluid by an independent mechanism. It is contemplated that the source may, for example, be the vehicle engine oil system, the vehicle cooling system, the vehicle engine exhaust system, or an electrical heating arrangement. If desired, a suitable thermostatic control mechanism may be provided so that heated fluid is admitted to passage 107 only at and below a predetermined ambient air temperature.

In normal operation of the system of FIGURE 1, pump 12 maintains pressurized fluid in chamber 68. Since the valve mechanism 78 is of the closed center type wherein no flow is permitted through the valve mechanism when no work is being done by the booster 24, the pressurized fluid in chamber 68 will be substantially static. Therefore, when low ambient air temperatures are encountered such that the viscosity characteristic of the fluid is increased beyond desirable limits, some viscosity fluid correction is highly desirable. Fluid is maintained in the hydraulic booster 24, and particularly in the power chamber 76, the conduit system 80 including reaction chamber 84, and the exhaust chamber 72. In normal operation, when the vehicle operator depresses the brake pedal 44, the push rod 50 moves the plunger 58 to the left, first seating valve seat 96 against valve 92, and then moving the valve 92 away from the seat 90. Thus the conduit 94 between the reaction chamber 84 and the exhaust chamber 72 is closed, after which the pressurized chamber 68 is placed in fluid communication with the power chamber 76 through the conduit system 80, including reaction chamber 84. Pressurized fluid in chamber 78 moves the power wall 74 to the left against the force of its return spring 75, moving the master cylinder piston 42 to the left to pressurize fluid in the master cylinder chamber 40. The brakes 38 are thus actuated. Pressurized fluid in reaction chamber 84 reflects the force of the booster applied to the master cylinder, and acts on reaction piston 86 to move the piston to the right against the force of its spring 100. This force is transmitted to the plunger 58 when the piston 86 engages the shoulder 59 provided on plunger 58 for this purpose after having overcome the force of spring 100 to this extent. The movement required to engage piston 86 and shoulder 59 is slight, since plunger 58 has already been moved to place the shoulder more closely adjacent the piston. Spring 100 may be so calibrated that the required pressure for this movement will be that pressure which will sufficiently actuate power wall 74 to move the brake shoes until they incipiently engage the brake friction surfaces such as the brake drums. Movement of piston 86 to the right to obtain fluid reaction causes a displacement of fluid from the exhaust chamber 72 commensurate with the increased fluid displacement of reaction chamber 84. When the fluid in the pressure chamber 68 is at a sufficiently high temperature to have normally desired viscosity characteristics, no problem is encountered in the operation of the valve mechanism 78 or the reaction piston 86. However, when low ambient air temperatures have so cooled the hydraulic fluid in the booster as to substantially increase the viscosity of that fluid, adverse effects may be obtained in either the valve mechanism 78, or in action of the reaction piston 86, or both. For example, the reaction piston 86 may be slow in moving to the right since it has to force high viscosity fluid out of exhaust chamber 72 through a relatively restricted outlet passage 102. Correction is made for the slow flow of fluid out of exhaust chamber 72 by providing the trapped air chamber 104 into which the fluid may also flow through passage 106. This allows piston 86 to more quickly respond to booster actuation pressure and generate reaction force to keep the operator more currently informed as to the actuation of the booster. Under these conditions, fluid pressure will continue to be removed from exhaust chamber 72 through outlet 102, and the fluid temporarily displaced into chamber 104 is returned through passage 106 to exahust chamber 72 and then out through passage 102. In the meantime the reaction piston has been able to more quickly respond to increased pressure in the reaction chamber 84 as the brake has been actuated. Chamber 104 is of sufficient volumetric capacity to provide for fluid displacement therein without a detrimental air pressure build-up. By heating the fluid so that it is maintained above a temperature which would create an undesirable high fluid viscosity, fluid may flow quickly through valve mechanism 78 and also quickly from the exhaust chamber 72. Therefore, the potential change in hydraulic fluid viscosity may be compensated for in this manner. In some constructions it is desirable to use both types of compensation to assure quick response of the mechanism under adverse low ambient air temperature conditions.

When the brake pedal 44 is released by the operator to release the brakes, valve 92 and plunger 58 are moved to the right by the valve spring means 98 to first seat valve 92 against seat 90 and close conduit system 80 so that power chamber 76 is no longer connected with pressurized chamber 68. The power piston 74 under influence of its return spring will keep a pressure on fluid in power chamber 76 and through conduit section 88 so that a pressure is maintained in reaction chamber 84 which continues to urge piston 86 and plunger 58 to the right. Thus the plunger 58 will have its seat 96 unseated from valve 92 and this pressure is then conducted to the exhaust chamber 72 through passage 94. Power wall 74 then can return to its released position. A suitable brake pedal return spring may be provided to return the pedal arm 46, and therefore the pedal 44, to the full release position. The reaction spring 100 will move the reaction piston 86 to the left to the position shown in FIGURE 1, and the brake will aagin be fully released with no reaction felt by the operator through the pedal 44.

What is claimed is:

1. In a fluid viscosity correcting hydraulic power booster, the combination comprising: a hydraulic pressure inlet chamber, a power chamber, a reaction chamber, an exhaust chamber, a source of hydraulic pressure connected to hold said pressure inlet chamber energized, said chambers being normally filled with hydraulic fluid the flow rate of which decreases with ambient air temperature, first conduit means fluid connecting said pressure inlet chamber and said power chamber, second conduit means fluid connecting said power chamber said reaction chamber, third conduit means fluid connecting said reaction chamber and said exhaust chamber, the flow rate of fluid flowing from at least one of said chambers being dependent upon the viscosity of said fluid, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and fluid viscosity correcting means connected with said at least one of said chamber and correcting fluid therein for fluid viscosity above a predetermined limit caused by low ambient air temperature and thereby permitting relatively unrestricted fluid flow from said at least one of said chambers connected with said fluid viscosity correcting means.

2. In a hydraulic power booster the combination of, a hydraulic pressure inlet chamber, a power chamber, a reaction chamber, an exhaust chamber, a source of hydraulic pressure connected to hold said pressure inlet chamber energized, said chambers being normally filled with hydraulic fluid, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and a chamber having air trapped therein and fluid connected with said exhaust chamber, said trapped air chamber acting to permit substantially undelayed fluid flow from said exhaust chamber upon fluid displacing movement of said reaction means in said exhaust chamber.

3. In a hydraulic power booster the combination of, a hydraulic pressure inlet chamber, a power chamber, a reaction chamber, an exhaust chamber, a source of hydraulic pressure connected to hold said pressure inlet chamber energized, said chambers being normally filled with hydraulic fluid, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and means including a chamber accepting a volume of hydraulic fluid and thereby compensating for the viscosity of hydraulic fluid in said exhaust chamber when the fluid therein resists movement of said reaction member due to fluid temperature.

4. A hydraulic power booster comprising, a hydraulic pressure inlet chamber, a power chamber, a reaction chamber, an exhaust chamber, a source of hydraulic pressure connected to hold said pressure inlet chamber energized, said chambers being normally filled with hydraulic fluid, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and means fluid connected with said exhaust chamber and relieving pressure therein exerted by movement of said reaction means due to pressure buildup in said reaction chamber and fluid flow limitations from said exhaust chamber.

5. In a hydraulic power booster, the combination of: a hydraulic pressure inlet chamber, a power chamber, a reaction chamber, an exhaust chamber, a source of hydraulic pressure connected to hold said pressure inlet chamber energized, said chambers being normally filled with hydraulic fliud, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and means including fluid receivable chamber means connected with said exhaust chamber and receiving fluid from said exhaust chamber to relieve pressure in said exhaust chamber exerted by movement of said reaction means due to pressure buildup in said reaction chamber and flow limitations from said exhaust chamber, and fluid heating means adjacent and in heat flow connection with at least one of said chambers and maintaining fluid therein at a higher temperature than ambient air temperature when ambient air temperature is below a predetermined level, said heating means correcting fluid therein for fluid viscosity above a predetermined limit caused by low ambient air temperature.

6. In a hydraulic power booster, a hydrualic pressure inlet chamber, a power chamber, a reaction chamber, an exhaust chamber, a source of hydraulic pressure connected to hold said pressure inlet chamber energized, said chambers being normally filled with hydraulic fluid, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster inactive condition and actuable to sequentially close said third conduit means and open said first conduit means to operate the booster and to sequentially close said first conduit means and open said third conduit means to release the booster, and means including trapped air chamber means fluid connected with said exhaust chamber and acting to permit substantially undelayed fluid flow therefrom upon fluid displacing movement of said reaction means in said exhaust chamber and thereby correcting fluid in said exhaust chamber for fluid viscosity above a predetermined limit caused by low ambient air temperature.

7. In a hydraulic power booster, a hydraulic pressure inlet chamber, a power chamber, a reaction chamber, an exhaust chamber, a source of hydraulic pressure connected to hold said pressure inlet chamber energized, said chamber being normally filled with hydraulic fluid, first conduit means fluid connecting said pressure inlet chamber and said power chamber, second conduit means fluid connecting said power chamber and said reaction chamber, third conduit means fluid connecting said reaction chamber and said exhaust chamber, reaction means separating said reaction chamber and said exhaust chamber and movable by pressure in said reaction chamber to displace fluid in said exhaust chamber, valve means normally keeping said first conduit means closed and said third conduit means open to maintain a booster in active condition and actuable to sequentially close said third conduit means and open said first conduit means to operate the booster and to sequentially close said first conduit means and open said third conduit means to release the booster, and means connected with at least one of said chambers correcting fluid therein for fluid viscosity above a predetermined limit caused by low ambient air temperature, said means including fluid heating means adjacent and in heat flow connection with at least one of said chambers and maintaining fluid therein at a higher temperature than ambient air temperature when ambient air temperature is below a predetermined level, said means further including a chamber having air trapped therein and fluid connected with said exhaust chamber, said air trapped chamber acting to permit substantially undelayed fluid flow from said exhaust chamber upon fluid displacing movement of said reaction means in said exhaust chamber.

8. A hydraulic fluid power mechanism comprising: a hydraulic fluid pressurized chamber and a hydraulic fluid power chamber and a hydraulic fluid pressure exhaust chamber and a closed center valve mechanism controlling hydraulic fluid pressure distribution therebetween, and means including a fluid viscosity-trapped fluid receiving chamber connected with at least one of said chambers and correcting fluid therein for fluid viscosity above a predetermined limit caused by low ambient air temperature by receiving fluid therein which would otherwise be trapped and pressurized in said at least one of said chambers because of high fluid viscosity.

9. The subject matter of claim 8, said means comprising a chamber having air trapped therein and the lower portion thereof in hydraulic fluid communication with said exhaust chamber, said trapped air chamber acting to permit immediate removal of excess hydraulic fluid from said exhaust chamber when hydraulic fluid removal therefrom is restricted to a flow rate below a desired minimum by increasing fluid viscosity.

10. The subject matter of claim 9, said means further comprising fluid heating means adjacent and in heat flow connection with said pressurized chamber and maintaining fluid therein at a higher temperature than ambient air temperature when ambient air temperature is below a predetermined level.

11. The subject matter of claim 8, said means further including fluid heating means adjacent and in heat flow connection with said pressurized chamber and maintaining fluid therein at a higher temperature than ambient air temperature when ambient air temperature is below a predetermined level.

12. The subject matter of claim 11, said fluid heating means comprising a fluid heat exchanger receiving fluid from a source of fluid at a temperature higher than the predetermined level of ambient air temperature.

References Cited by the Examiner

UNITED STATES PATENTS

| | | | |
|---|---|---|---|
| 1,476,748 | 12/1923 | Wood | 92—144 X |
| 2,247,802 | 7/1941 | Damerell | 92—144 X |
| 2,293,854 | 8/1942 | Sauzedde | 60—54.6 |
| 2,424,901 | 7/1947 | Richolt | 91—384 X |
| 2,591,429 | 4/1952 | Harrower | 137—340 |
| 2,900,995 | 8/1959 | Dickerson et al. | 137—340 |

FOREIGN PATENTS 543,438   5/1956   Italy.

SAMUEL LEVINE, *Primary Examiner.*

ROBERT R. BUNEVICH, *Assistant Examiner.*